May 19, 1970     J. SCHLESINGER     3,512,330

CHAIRS FOR REINFORCING RODS

Filed Feb. 23, 1966     3 Sheets-Sheet 1

INVENTOR
Jan Shlesinger
BY
ATTORNEYS

May 19, 1970  J. SCHLESINGER  3,512,330
CHAIRS FOR REINFORCING RODS
Filed Feb. 23, 1966  3 Sheets-Sheet 2

INVENTOR
Jan Shlesinger
BY
*Hayes Leonard & Pueff*
his ATTORNEYS

May 19, 1970   J. SCHLESINGER   3,512,330
CHAIRS FOR REINFORCING RODS
Filed Feb. 23, 1966   3 Sheets-Sheet 3

INVENTOR
Jan Shlesinger
BY
ATTORNEYS

United States Patent Office 3,512,330
Patented May 19, 1970

3,512,330
CHAIRS FOR REINFORCING RODS
Jan Shlesinger, Charleston, W. Va., assignor to Kenneth C. Kerman, doing business as K Square Engineering Company, Pittsburgh, Pa.
Filed Feb. 23, 1966, Ser. No. 529,375
Int. Cl. E04c 5/16
U.S. Cl. 52—677            9 Claims

ABSTRACT OF THE DISCLOSURE

Various forms of support and/or tie chairs are disclosed for reinforcing rods and the like. The chairs are capable of use at rod crossing, straight runs, and lap joints. The chairs include a pair of generally up-right wall members which are spacedly joined to a base member. The base member can be reentrantly joined to the wall members to provide legs for the chair. The wall members, and in some cases the base member, are notched to receive the reinforcing rods. In some forms of the chair, securance tabs are arranged for bending over the reinforcing rods by a pressing and twisting movement of a workman's foot.

---

The present invention relates to reinforced concrete structures and more particularly to a combination supporting and tie chair for tying and supporting the mat of reinforcement rods or bars customarily provided in various reinforced concrete structures.

In the fabrication of reinforced concrete structures, for example foundation footers, structural walls and beams, and in highway construction it is customary to arrange a relatively large number of reinforcement rods into a suitable arrangement or mat thereof with the rods extending in a direction as determined by the loads to be applied to the concrete structure. The reinforcing rods are of various diameters or cross-sectional configuration as determined by the loads to be applied to the concrete structure, and the rod mat is positioned within the concrete wall, beam, footer or other structure so as to be located in the areas of the principal tensil stresses resulting from the rods applied to the structures. Thus, it is extremely important that the rod mat be properly spaced from the adjacent mold surfaces utilized in pouring the concrete. For example, in the case of foundation footer construction or in highway construction, it is essential that the rod mat be supported at a predetermined distance above the sub-grade.

In the past many items of supporting and tying hardware have been experimented with and generally rejected because of fabricational expense, insufficient structural strength, or because hand and other tools are required to secure such prior art devices to the rod mat in the field. Moreover, several different items of such hardware would have been required to complete the rod reinforcement mat; for example, different items of such hardware are required for tying the rods together at corner intersections between rods in the mat, for tying lapped ends of rod lengths together along straight runs of reinforcement rod, and for generally supporting the rod mat along such runs and at such intersections to prevent sagging thereof. The requirement for such multiple hardware items would have greatly increased the time required for completing the reinforcement mat arrangement in the field, and thus workmen have usually resorted to resting the reinforcement mat upon stones or bricks which weaken the concrete structure, but which have been generally used since the advent of reinforced concrete.

In the fabrication of elevated concrete structures such as floors or beams in the upper stories of a building, the conventional items of rod tying and supporting hardware have to be embedded in, or have a relatively large surface resting upon, the bottom mold structure, which usually is wood, such that when the mold is removed from the concrete structure after pouring thereof unsightly projections are visible which have to be removed. Usually such hardware is fabricated from steel, the exposed areas of which tend to rust after removal of the mold structure and produce unsightly surface areas where the underside of the concrete structure is visible.

Frequently, also, prior art hardware of the character described permits the reinforcement rods to sag to the bottom of the mold structure, or to the sub-grade as the case may be, when the wet concrete mixture is poured into the mold with the result that the reinforcement provided by the rod is diminished or lost at such exposed areas, and moreover, the rod weakened from rusting to further reduce its reinforcement value. In overhead structures the reinforcement rods exposed in this fashion in addition lost their fire resistance as a result of the lack of covering concrete.

Finally, the structural strength of such tying items and supporting hardware as afforded by the prior art is usually insufficient to resist the downward and lateral pressures developed as the wet concrete mix is poured, usually as rapidly as possible, into the mold structure and rapidly and laterally proceeds along the mold structure and the reinforcement mat.

The aforementioned shortcomings and problems of the prior art devices of the character described are overcome by the present invention which provides a rod tying and supporting chair having the combined features of being arranged to tie the bars together at corner intersections thereof where the bars are usually disposed on different elevations, of supporting the rods at such intersections or along free or straight runs thereof as encountered in foundation footer structures, and of supporting and tying lapped ends of individual reinforcing rods together where several lengths of such rods are used along a single rod run and are disposed at the same elevation. In one arrangement of the rod chair, the latter is provided with a relatively wide base that will not sag or penetrate into the sub-grade soil and is further provided with upstanding rod securance means which can be more or less rigidly secured at spaced locations to the rod mat such that the upstanding portions will resist considerable, laterally applied forces (resulting from the flow of wet concrete through the mold) without sagging, deflection or buckling which would otherwise change the elevation of the rod mat relative to the sub-grade or bottom of the mold. In other arrangements the chair base is provided with means for affixing the chair to the sub-soil when required. In certain arrangements of the invention the rod securance means of the rod chair can be adjusted in the field to different relative elevations or to the same elevation as required to support a single rod or to join intersecting or lapped rods at the same or different elevations, depending upon the position of the rods in the mat structure. The rod chair of the invention is further provided with means for securing the chair to the rod mat without the use of tools of any kind.

In other arrangements of the invention the aforementioned chair base is spaced upwardly from the bottom or leg or other supporting portions of the rod chair so that the concrete can flow thereunder to prevent any significant portion of the chair from being visible in the case of elevated concrete structures, when the mold structure is removed. In such cases the supporting members or legs of the chair make only line contact with the bottom wall or floor of the mold structure such that the rod chair is largely concealed.

Moreover, it is contemplated that the aforementioned chair legs or supports can be coated with a protective material such as polyethylene or other plastic material to prevent the exposed supporting surfaces of the chair from rusting. For the same purpose the aforementioned leg portions or the entire chair can be fabricated from galvanized sheet or from sheet steel provided with other rust inhibiting coating. In the latter arrangement of the invention it is contemplated that in most applications where the concrete pour is not extremely heavy or rapid the chair base will be spaced both from the bottom of the mold structure as has been stated and also from the underside of the rod mat supported thereby to facilitate complete embedment of the concrete around the adjacent portions of the reinforcement rods. However, in the case of extremely heavy concrete pours the rod chairs of the invention can be provided with additional vertical and lateral reinforcement against the pressures and lateral thrusts developed by the poured and flowing concrete by spacing the aforementioned chair base further upwardly from the bottom of the mold structure such that the adjacent portions of the rod mat rests thereon.

In still other arrangements of the disclosed tying chair the base is folded upwardly and provided with additional rod engaging and supporting means for this purpose.

As pointed out previously the rod tying and supporting chairs of the invention are fabricated in a manner such that they can be secured to the rod mat without the use of tools. In furtherance of this purpose the rod securance means thereof are arranged in certain modifications for manipulation by men in the field as the mat is being assembled and in other modifications securance is effected simply by stepping on the rod chair and twisting or rotating the foot slightly.

These and other objects, features and advantages of the invention together with structural details thereof will be elaborated upon during the forthcoming description of certain presently preferred embodiments of the invention and of certain presently preferred methods of practicing the same.

In the accompanying drawings there are shown certain presently preferred embodiments of the invention together with preferred methods of practicing the same wherein FIG. 1 is an isometric view of one form of the rod tie chair of the invention arranged for supporting and tying a corner intersection of reinforcement rods where the rods are necessarily disposed at different elevations;

Figure 12A:
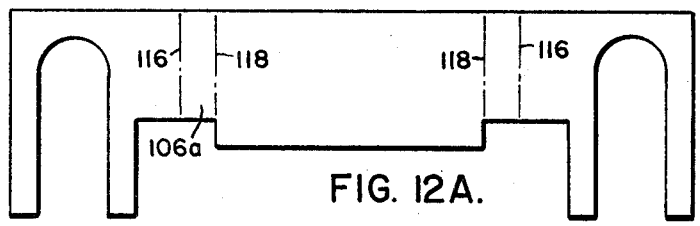
FIG. 12a is a top plan view showing the stamping from which the chair of FIG. 12 is fabricated.
Figure 12:
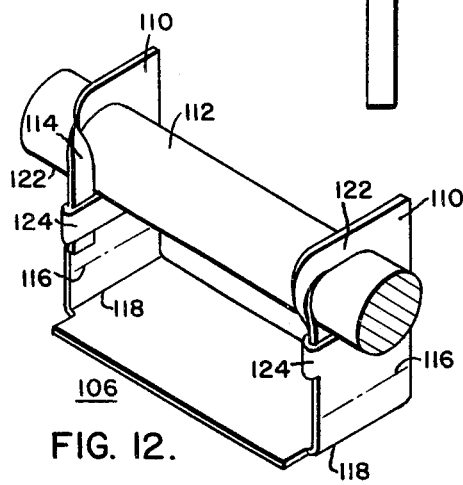
FIG. 12 is an isometric view of another form of the rod tie chair of the invention used for supporting and tying reinforcing rods at straight runs thereof.
Figure 13:
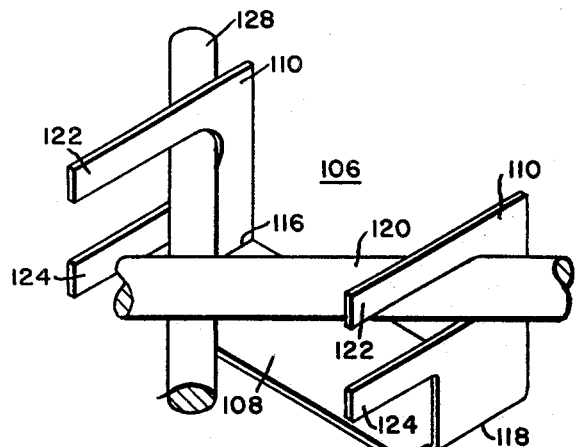
Figure 14:
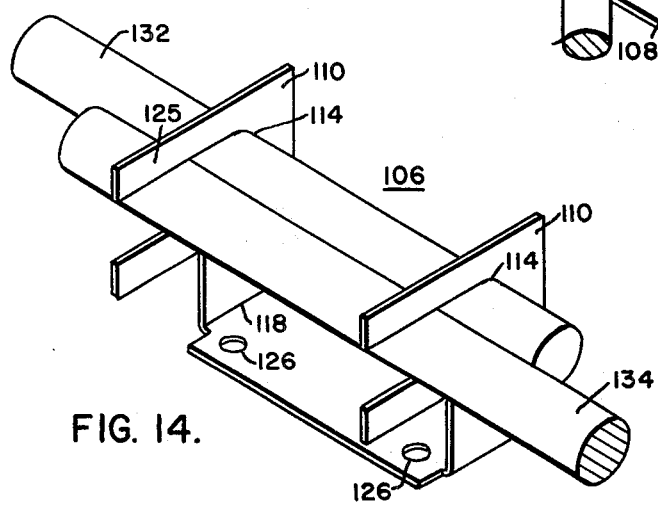

FIG. 13 is an isometric view of a rod supporting tie chair similar to that shown in FIG. 12 but arranged for use in supporting and tying reinforcing rods at corner intersections thereof; and FIG. 14 is an isometric view of still another form of the rod tie chair of the invention similar to that shown in FIG. 12 but shown here as used for both lap-joining and supporting a pair of parallel extending reinforcing rods to form a continuous run thereof.

Figure 1:
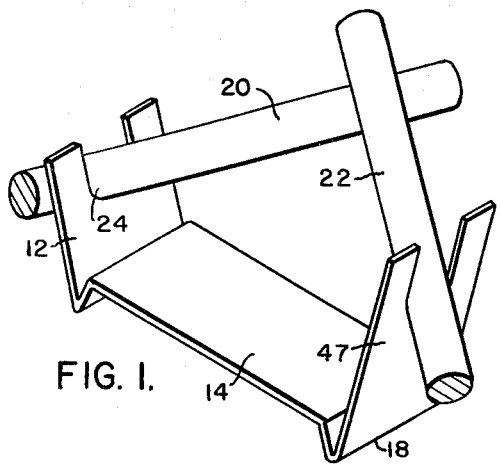

In FIG. 1 of the drawings an exemplary arrangement of the tying and supporting chair of the invention is illustrated and is adapted particularly for use in above-grade pours where the underside of the concrete structure may be visible. The chair 10 includes a pair of spaced upstanding end walls 12 connected by a base member 14. In this arrangement, however, the base member 14 is reentrant or bent upwardly adjacent its ends to provide a pair of spaced leg portions 16 for the tie chair 10, at the lower extremities respectively of the end walls 12. The leg portions 16 thus engage the bottom of the mold structure in which the concrete is to be poured at only line contact so that very little of the tie chair 10 is visible at the underside of the concrete structure when the mold is removed therefrom. Desirably, the tie chair 10 is galvanized to prevent rusting particularly at the aforementioned leg portions 16 in order to prevent staining of the adjacent concrete surfaces. Alternatively, the lower portions of the leg portions 16 can be dip-coated with a suitable plastic material such as polyethylene or an epoxy resin, to prevent rusting of the protruding leg portions 16. If desired, the plastic covering 18 can be colored about the same shade as the cast concrete to render any visible areas of the leg portions 16 even less obvious.

In the arrangement as shown in FIG. 1, the tie chair 10 is adapted for both tying and supporting reinforcing rods 20 and 22 at intersections thereof where they are disposed on differing elevations. Accordingly, as shown in FIG. 1 the right end wall 13 is provided with a correspondingly greater height to accommodate the elevational difference of the reinforcing rods 20 and 22. The rods 20 and 22 are seated respectively in notches 24 formed respectively and centrally in the upper ends of the end walls 12 and 13 with tab portions 26 and 28 remaining on either side of each notch 24. The upstanding tabs 26 and 28, for example, the tabs on the left end wall 12, can be bent and folded over the associated reinforcing rod 20 to the positions as shown by the tabs 26 and 28 of the right end wall 13, simply by a workman pressing his foot on the upper ends of the tabs 26, 28 and twisting counterclockwise in this case (or clockwise in the case of the right end wall tabs 26, 28).

Figure 2:
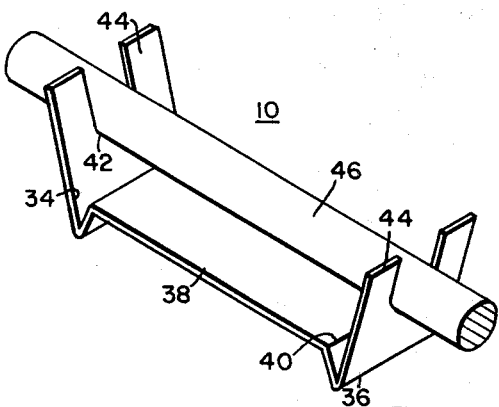
FIG. 2 is an isometric view of the rod chair of the invention, arranged generally as shown in FIG. 1, but manipulated for supporting a straight run of reinforcing rods.

Referring now to FIG. 2 of the drawings a similar form 10' of the tie chair is illustrated therein. The latter arrangement of the invention is adapted as shown for use in supporting a straight rod run and thus the end walls 30 thereof are each folded along inward crease lines 36, respectively, to the same height to support a single reinforcing rod 32. However, the tie chair 10' can be adapted to the application as illustrated in FIG. 1 by folding either end wall 30 along the associated outer crease line 34 provided on each end wall 30. The elevated base member 38 of the tie chair 10' is provided with crease lines 40 at each end thereof so that stampings (now shown) of the tie chairs can be shipped in a flat condition, similar to that described below with reference to FIGS. 6a and 12a, to the field where they can be bent along the crease lines 40 and 34 or 36 to the desired configuration. Alternatively, a group of the tie chairs can be pre-formed completely and then nested for shipping purposes.

The reinforcing rod 32 thus is seated in notches 42 of the end wall 30, the adjacent tabs 44 and 46 of which can be bent over the reinforcing rod 32 in the manner described above with reference to FIG. 2 and the tabs 26 and 28.

In the tie chairs 10 and 10', as arranged in accordance with the invention, the base members 14 and 38 respectively thereof are spaced downwardly from the reinforcing rods but upwardly from the bottom of the mold structure to permit the wet concrete to flow over and under the base members 10 and 38 to embed the reinforcing rods securely in the concrete.

Figure 3:
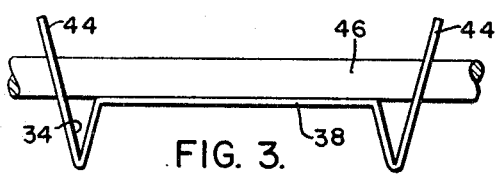
FIG. 3 is a side elevational view of another form of rod mat supporting and tying chair arranged in accordance with the invention.

In the tie chair 48, as arranged in FIG. 3 of the drawings the base member 50 thereof is elevated still further to engage the underside of the reinforcing rod 52 in order to lend additional support thereto so that the tie chair 48 may better resist the greater pressures and lateral forces of extremely heavy concrete pours, without increasing the thickness of sheet material from which the tie chair 48 is stamped. The tie chair 48 is otherwise arranged similar to that illustrated in either FIG. 1 or FIG. 2 of the drawings.

Figure 4:
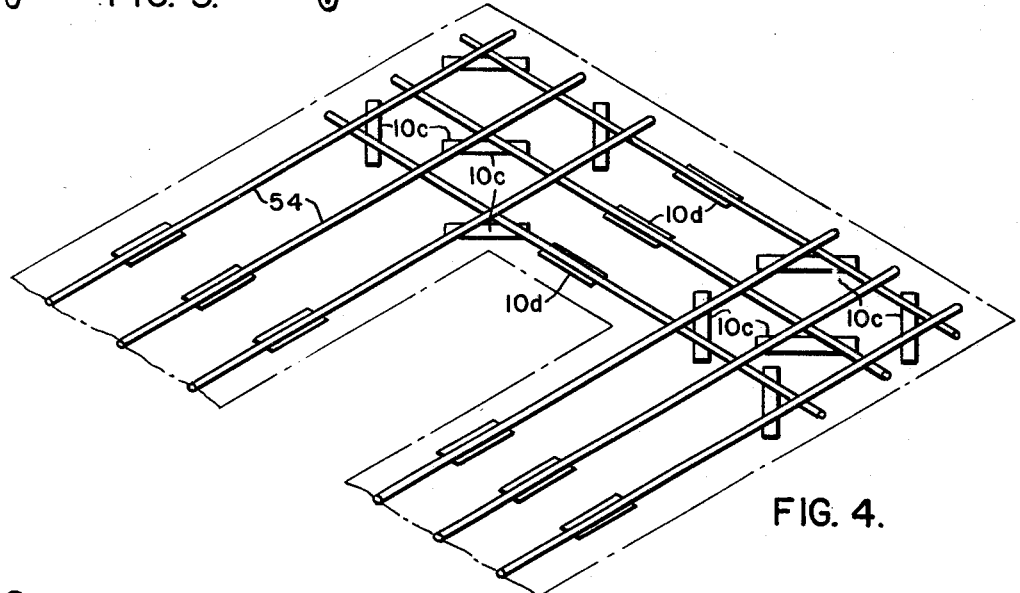
FIG. 4 is an isometric view of an exemplary form of reinforcement rod layout or mat with which the rod chairs of the invention can be utilized, and showing one arrangement for strategically locating the rod chairs for both tying and supporting the reinforcement rods of the mat.

As better shown in FIG. 4 of the drawings, chair arrangements of the invention, for example the tie chair 10 or 10' (FIGS. 1 and 2), can be utilized at L, T or X intersections of reinforcing rods, as denoted by the relative positions of tie chairs 10a, 10b and 10c, respectively. For a rod mat, designated generally by the reference character 52 for use in a foundation footer type pour additional tie chairs 10 as arranged in FIGS. 2 or 3 can be utilized along the straight runs of reinforcing rods 54 as denoted by tie chairs 10d.

Figure 5:
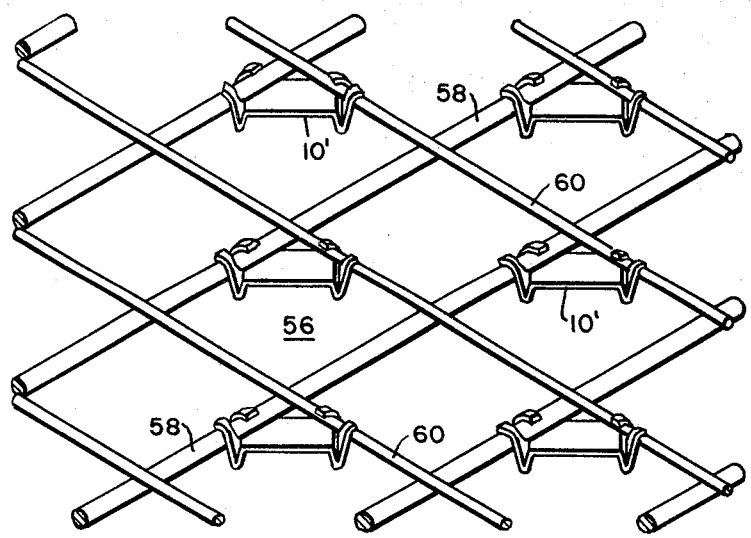
FIG. 5 is an isometric view of another exemplary form of reinforcement rod mat showing use of the rod tie chairs of the invention.

In FIG. 5 of the drawings another form of rod mat 56 is illustrated and arranged in the form of an open mesh of longitudinal and transverse reinforcing rods (as viewed in FIG. 5) wherein certain of the tie chairs 10' are strategically located both for tying the individual rods of the mat 56 together and for supporting the resulting rod mat.

Figure 6:
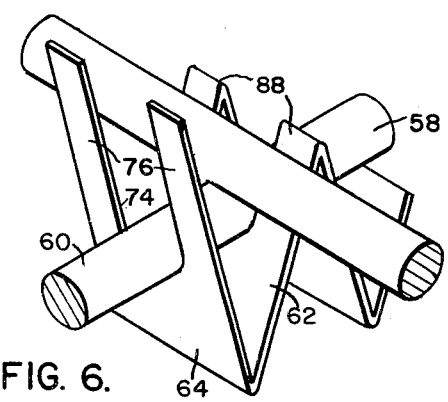
FIG. 6 is a front and right side isometric view of still another form of rod tie chair of the invention.

In furtherance of the purpose of lending additional support to reinforcing rods 58 and 60, as better shown in FIG. 6 of the drawings, a base member portion of still another form of tie chair of the invention can be provided as an inverted V-shaped structure 62. The base member 62 re-entrantly engages a pair of spaced wall members 64 and 66 the junctions with which form the leg portions 68 of the tie chair. The leg portions 68 can be provided with a protective coating as noted above in connection with FIG. 1 of the drawings.

The base structure 62 is slotted as denoted by reference character 70 in order to accommodate the lower one of the rods, for example, rod 58 extending axially of the tie chair. If the longitudinal and transverse rods of the mat (FIG. 5) are of different sizes, the lower rod usually is the larger in diameter of the two. The ends 72 of the slot 70 desirably lie on a plane passing through the top edge of wall 66 and through the bottom end of a slot 74 formed in the other wall 64. This arrangement affords four points of support for the lower rod 58 by the tie chair.

The wall slot 74 also defines a pair of upstanding securance tabs 76 forming part of the wall 64. The reinforcing rod 60 rests upon the lower rod 58 extending transversely thereof, but is secured to the tie chair by bending its securance tabs 76 thereover, which operation, of course, also secures the lower rod 58 to the tie chair of FIG. 6. Particular modes of bending the secured tabs 76, or modified forms thereof, will be described below with reference to FIGS. 8, 9 and 11.

The arrangement of the tie chair as shown in FIG. 6 operates to prevent sliding of the tie chair axially along the lower reinforcing rod 58, i.e., in the direction denoted by arrow 78. This results from the frictional engagement of the ends of wall slot 74 and base slot 70 and the top edge of wall 66 with the undersurface of the rod 58. In order to provide a maximum of support to the rods 58 and 60 at their junction, as shown, it is desirable that the occluded angles of the junction between the walls 64 and 66 and the base structure 62, i.e., at the leg portions 68 of the tie chair be limited to a maximum of about 38° as denoted by reference character 79. With this arrangement the downward forces developed by the downward pour of the tie chair are adequately resisted by the upstanding walls 64 and 66 and the inverted V-shaped base structure 62.

Figure 6A:
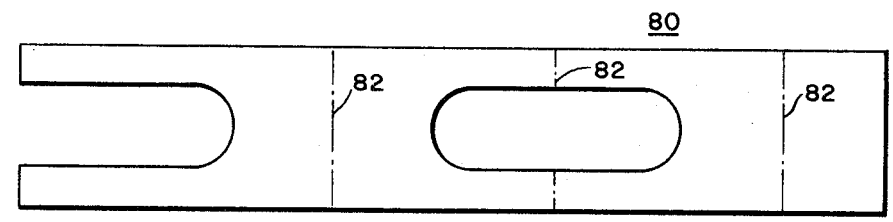
FIG. 6a is a top plan view of a pre-creased stamping from which the tie chair of FIG. 6 is fabricated either at the factory or in the field.

In FIG. 6a of the drawings, a stamping 80 from which the tie chair of FIG. 6 is formed by folding along dashed lines 82 is illustrated. The stamping 80 can be preformed at the factory to form the corresponding tie chair, or alternatively, the stamping 80 can be pre-creased along the fold lines 82 at the factory and shipped in the flat condition for forming in the field, to further conserve shipping space.

Figure 7:
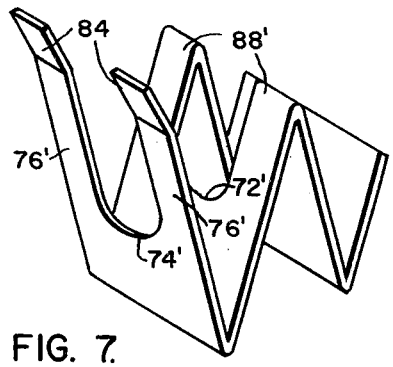
FIG. 7 is a similar isometric view of a modified form of the tie chair as illustrated in FIG. 6.

In FIG. 7 of the drawings, a modification of the tie chair of FIG. 6 is illustrated wherein the upper or end portions 84 of securance tabs 76' are folded outwardly to aid in securing the chair to the reinforcing rod. As better shown in FIG. 8 of the drawings, when assembling the reinforcing rods 58' and 60' with the tie chairs of FIGS. 6 and 7 it is anticipated that slots 72 or 72' and 74 or 74' will be provided with sufficient width to accommodate the largest diameter rod 58 or 58' to be used. On the other hand another diameter rod 60 or 60' extending transversely of the aforementioned rods is accommodated by forcing the rods, for example 60', downwardly against the sides of the adjacent wall 64' with the result that the wall 64' springs outwardly to the position indicated by dashed outlines 86 to permit passage of the larger, upper reinforcing rod 60'. When thus positioned, the securance tabs 76 or 76' are bent to the right, as viewed in FIG. 8 over the top of the upper reinforcing rod 60' to secure the rods 58' and 60' at their junction. The tabs of course can be bent over in this fashion without the use of special tools and for example can be so bent by stepping lightly on the tie chair with the foot. Desirably, however, the end portions of the tabs are jammed downwardly into the recesses between the reinforcing rod 60' and the slotted portions 88 of the base structure 62', as denoted by reference character 90. In order to facilitate insertion and wedging of the tab end portions into the aforementioned recesses, the tabs can be provided with the pre-bent end portions 84, as shown in FIG. 7. The bending of the tab end portions downwardly into the aforementioned recesses increases the frictional engagement or bite of the tab end edges relative to the juxtaposed surfaces of the slotted base portions 88'.

It is to be understood, of course, that it is not essential for the tabs 76 or 76' to be jammed or wedged into the aforesaid recesses between the reinforcing rods 60 or 60' and the base structure slotted portions 88 or 88'. In those applications where permissible, the tie chair can be secured to the rods with less rigidity, simply by bending tabs 76" over the top of the transversely extending rod 60" as better shown in FIG. 8a. In the latter arrangement of the invention the tabs 76" obviously can be made correspondingly shorter in length.

Irrespective of the particular arrangement of securance tabs which are used for fastening the transfer rods, it is desirable that the peak or mid-section 92 of the base structure 62 or 62' extend at least above the longitudinal axis of the largest diameter rod with which the tie chair is to be used. This arrangement increases the encirclement of the upper or transverse reinforcing rod by the securance means forming part of the tie chair and including tabs such as 76 and the slotted portions 88 and 88', as better shown in FIG. 8a.

Figure 9:
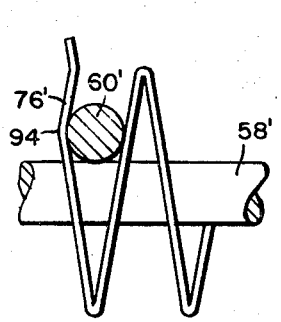
FIG. 9 is a similar elevational view illustrating another modified form of the rod tying means illustrated in FIG. 8.

In FIG. 9 of the drawings, a similar tie chair is illustrated and the tabs 76' thereof are pre-bent as denoted by reference character 94 so as to be inclined generally in the direction in which they are to be bent over the upper reinforcing rod 60'. This ensures that the tabs 76' of FIG. 9 will be bent in the proper direction when stepped on or otherwise manipulated. A slight reverse bend 96 can be provided in the securance tabs 76' of FIG. 9 in order initially to enlarge the opening between the tabs and the adjacent slotted portions 88' of the tie chair of FIG. 9 to facilitate insertion of the upper reinforcing rod 60' therein.

Figure 10:
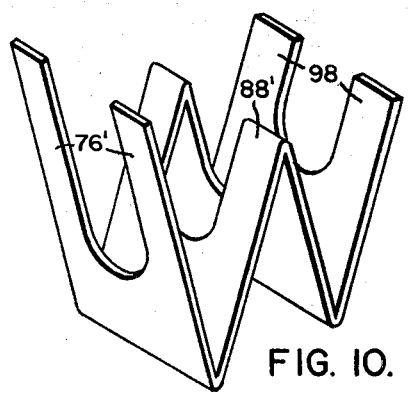
FIG. 10 is a front and right side isometric view of still another modified form of the tie chair illustrated in FIGS. 6 and 7.
Figure 11:
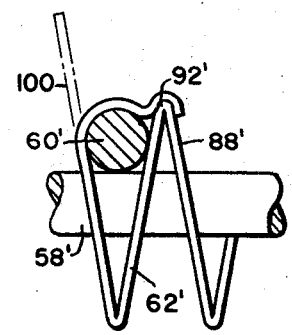
FIG. 11 is a right side elevational view of the tie chair similar to that shown in FIG. 6 and illustrating a modified use of the rod tying means forming part thereof.

Referring now to FIGS. 10 and 11 of the drawings, a further modification of the tie chair of FIG. 6 is illustrated. The latter type chair is similarly provided with upper reinforcing rod securance tabs 76' and also with lower reinforcing rod securance tabs 98. The lower rod securance tabs 98 are fastened about the rods 58' (not shown in FIG. 10) by twisting and bending generally in opposite directions over the lower rod, as illustrated with tabs 26, 28 of FIG. 1 of the drawings. As set forth in connection with the last-mentioned figure, securance can be made by stepping on the upwardly projecting ends of the tabs 98 and turning the foot slightly.

Figure 8:
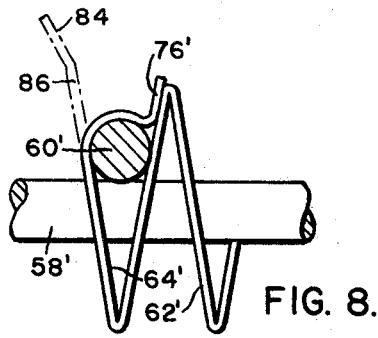
FIG. 8 is a right side elevational view of the rod tie chair as illustrated in FIG. 7 and showing its use with differing sizes of rods and the operation of fastening or tying means forming part thereof.
Figure 8A:
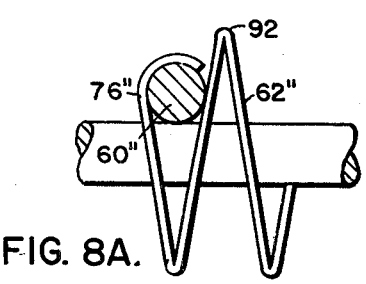
FIG. 8a is a similar elevational view of a similar rod tie chair but showing a modified form of the fastening means illustrated in FIG. 8.

Securance tabs 76' of FIG. 10 can be secured in a variety of manners such as illustrated in FIG. 8, 8a or 9. Alternatively, as shown in FIG. 11, the securance tabs 100 can be provided with correspondingly longer upward length and bent over towards the upper surface of the transverse rod 60' and over the peak 92' of the tie chair base structure 62', after which the end portion 102 of the tab 100 can be bent downwardly along the adjacent surfaces of slotted base portions 88'. To facilitate engagement of the tab end portions 102 with the base structure 62' in this fashion, the tabs 100 can be provided with prebent end portions 102', as indicated by the dashed outlines thereof in FIGS. 10 and 11. In furtherance of this purpose the tabs 100 can be prebent as shown at 102' or can be precreased at one or more locations 104 to facilitate bending the end portions 102 in this manner in the field, as determined by the sizes of the reinforcing rods being employed.

Referring now to FIGS. 12, 12a, 13 and 14 of the drawings, the exemplary form of the invention illustrated therein includes a rod chair arrangement denoted generally by the reference character 106 and fabricated from a suitable structural material such as sheet steel or galvanized steel. The chair 106 includes base portion 108 and a pair of notched, upstanding end walls 110 arranged for supporting one or more reinforcing rods 112 when inserted into the notches 114 respectively thereof.

The rod chair 106 can be fabricated by stamping as a flat or collapsed member from the aforementioned sheet material to produce a shape such as that shown in FIG. 12a of the drawings. Desirably, for reduction of shipping expenses, the rod chair can be supplied to the field or point of use in the flat or collapsed condition denoted at 106a in FIG. 12a. When the stamping 106a is thus made, a pair of spaced creases or fold lines 116 and 118 are formed adjacent each end of the base portion 108 of the chair stamping 106a. The thickness of the material comprising the stamping 106a is sufficient to lend the necessary structural strength to the chair 106 when assembled as shown in FIG. 12, but also is thin enough to permit bending of the stamping 106a at either of the folds or creases 116 or 118 to produce the desired height of the chair end walls 110, which in turn defines the distance at which the reinforcing rod 112 is supported above the bottom of the mold structure or sub-grade upon which the concrete is to be poured.

For example, to fabricate the chair 106 as illustrated in FIG. 12, the stamping 106a is folded or creased at its fold lines 120 to produce maximum elevation of the reinforcing rod 112. On the other hand, to support, for example, a reinforcing rod (not shown) passing under the rod 112 in the formation of the reinforcing rod mat, the side walls 110 can be folded at the outermost creases 116 in order to permit such passage. It is contemplated that additional creases (not shown) can be added to the stamping 106a, and that the creases 116, 118 as shown can be disposed closer or farther apart in order to accommodate reinforcing rods of different diameters or otherwise to support reinforcing rods at a different elevation above the bottom of the concrete pour.

In this arrangement of the invention each chair end wall 110 is provided with a pair of generally horizontally extending tabs 122 and 124 disposed respectively at the sides of the associated end wall notch 114. As stated previously the material comprising the stamping 106a (FIG. 12a) is sufficiently thin to permit bending thereof by hand or with the fingers and the tabs 122 and 124 of each end wall 110 are bent in this fashion, preferably to the positions shown in FIG. 12, to secure each end wall 110 to the reinforcing rod 112. Thus, the rod chair 106 is secured at two spaced locations to the reinforcing rod 112 in order to afford a maximum of support to the rod 112 and to prevent collapse of the chair 106 under the pressures and laterally exerted forces produced when a relatively large amount of wet concrete mixture is dumped into the mold.

If desired the base plate 108 of the rod chair can be secured to the sub-grade or to the bottom of the mold structure as the case may be, by the insertion of spikes or other fastening means (not shown) through suitably located holes 126 in the base portion 108. In this arrangement of the invention, the base portion 108 is made relatively wide and flat and is arranged to seat flushly upon the sub-grade such that where the concrete is poured on soil the supporting chair 106 will not penetrate into the soil as a result of the pressures and lateral forces applied thereto by the poured concrete.

Referring now more specifically to FIG. 13 of the drawings the stamping of FIG. 12a is illustrated as folded in a different manner to adapt the tie chair 106 for use in tying reinforcing rods 128 and 130 for example, at corner intersections thereof. In furtherance of this purpose the tie chair of FIG. 13 is folded at its left end wall 110, as viewed in FIG. 13, along the outer fold crease 116 thereof to accommodate the left end wall to the elevation of the lower reinforcing rod 128. On the other hand, the right end wall 110 of the chair 106 is folded along its inner crease 118 in order to accommodate the right end wall to the greater elevation of the reinforcing rod 130. The tabs 122 and 124 of each end wall 110, which are adjacent the notches 114 into which the reinforcing rods 128 and 130 are respectively inserted, are then folded (not shown in FIG. 13) to the positions as shown in FIG. 12 in order to secure the reinforcing rods 128 and 130 together and to support the rod mat.

Referring now more specifically to FIG. 14 of the drawings, a similar disposition of the stamping 106a is illustrated, but is here folded at the outer creases 116 of each of its end walls 110. The chair 106 of FIG. 14 is further illustrated as lap-tying two reinforcing rods 132 and 134 together to form a continuous straight run thereof, as may be encountered in elongated concrete pours, for example, foundation footers. The aforementioned tabs 122 and 124 of each end wall 110 are of sufficient length to permit bending and folding, as shown in FIG. 12, in order to tie the lapped ends of the reinforcing rods 132, 134 together. The rods 132, 134 in this example, are thus supported generally at the same elevation in the notches 114 of the end walls 110. It will be understood, of course, that the rods 132, 134 can be lap-tied and supported on a higher elevation by folding the end walls 110 along the inward creases 118.

From the foregoing it will be apparent that novel and efficient forms of reinforcement rod tie chairs have been disclosed herein.

I claim:

1. A tying chair for reinforcing rod means, said chair comprising a base member, a pair of upstanding wall members joined at spaced locations to said base member, a pair of rod securance tabs secured adjacent the outer end of at least one of said wall members and spaced to define a rod receiving notch therebetween, said wall members being disposed to support said rod means on their outer ends, and said securance tabs being bendable over said rod means to secure said rod means to said chair, said notch and said tabs being of sufficient length to receive the lapped ends of a pair of generally parallel extending reinforcing rods for supporting and lap-typing said rods, and said base member being reentrantly joined to the lower ends of said wall members.

2. A tying and supporting chair for reinforcing rod means, said chair comprising a pair of upstanding spaced wall members, at least one of said wall members having a rod receiving notch adjacent the upper end thereof, said notch forming tabs bendable over said rod means, and a base member reentrantly joined to said wall members to form spaced supporting leg portions for said chair at the lower extremities of said wall members respectively and to space said base member above the bottom surface of a concrete pour.

3. The combination according to claim 2 characterized further in that both of said wall members are so provided with securance tabs, and said base portion is reentrant to the extent to at least intersect on a plane passing through the lower edges of at least one of the notches to lend additional support to reinforcing rod means supported thereby.

4. The combination according to claim 2 characterized further in that said notch means open on the upper edge of the associated wall member respectively to form a pair of upstanding tabs the upper ends of which project above said reinforcing rod means when seated in said notch so that said tabs can be bent thereover by pressing and twisting movement of a workman's foot.

5. The combination according to claim 2 characterized in that notch means of one of said wall members is disposed at a different elevation relative to the notch means of other of said wall members to accommodate crossed reinforcing rod means tied by said chair.

6. The combination according to claim 2 characterized in that said base member is folded upwardly, and a fold in said base member is notched with the ends of said notch lying generally on a plane passing through the outward end of at least one of said wall members to provide a multi-point and balanced support for said rod means.

7. The combination according to claim 6 wherein said tabs are spacedly secured to the outer end of said one wall member, said tabs having sufficient length and being deformable so as to be bendable over a reinforcing rod lying between said one wall member and the adjacent side of said base fold when mounted transversely on another such rod positioned in said notches.

8. The combination according to claim 7 characterized in that the other of said wall members terminates in a supporting edge abutting the adjacent side of said other rod when positioned in said chair notches.

9. The combination according to claim 6 wherein said securance tabs are secured to the outer end of at least one of said wall members, and the upper end of each of said wall members terminates at said plane.

References Cited

UNITED STATES PATENTS

| | | | |
|---|---|---|---|
| 985,734 | 2/1911 | Dull | 52—685 |
| 1,124,537 | 1/1915 | Schoenthaler | 52—685 |
| 1,240,137 | 9/1917 | Hartman | 52—687 |
| 1,254,853 | 1/1918 | Schoenthaler | 52—684 |
| 1,613,351 | 1/1927 | Klinger et al. | 52—684 XR |
| 1,637,742 | 8/1927 | Edge et al. | 52—685 |
| 1,882,499 | 10/1932 | Johns | 52—687 XR |
| 2,278,917 | 4/1942 | Curry | 52—677 XR |
| 2,911,819 | 11/1959 | Austin | 52—684 |
| 3,257,767 | 6/1966 | Lassy | 52—712 XR |

FOREIGN PATENTS

| | | |
|---|---|---|
| 247,389 | 3/1947 | Switzerland. |
| 143,641 | 1/1954 | Sweden. |
| 401,762 | 8/1909 | France. |
| 526,247 | 9/1940 | Great Britain. |
| 34,946 | 3/1950 | Poland. |

BOBBY R. GAY, Primary Examiner

A. M. CALVERT, Assistant Examiner

U.S. Cl. X.R.

52—687